Sept. 12, 1933.　　　J. H. DE BOER　　　1,926,994
DRESSER MIRROR HANGER
Filed Sept. 9, 1932
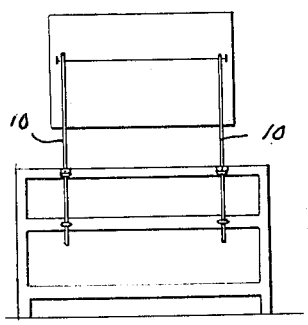
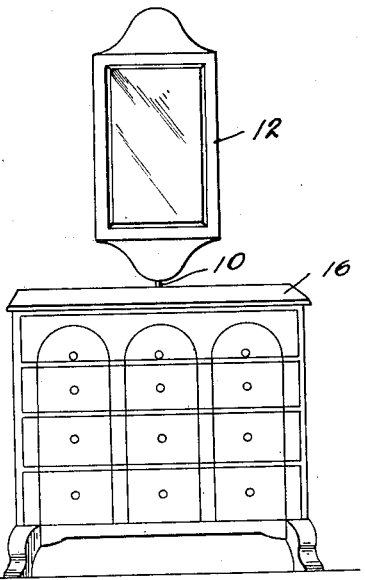
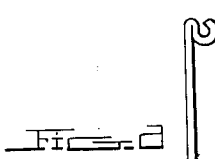
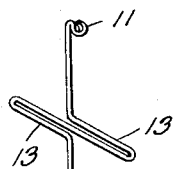
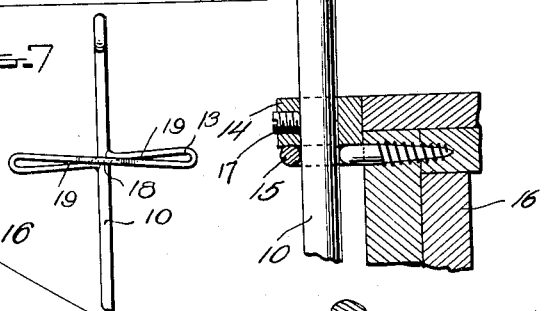
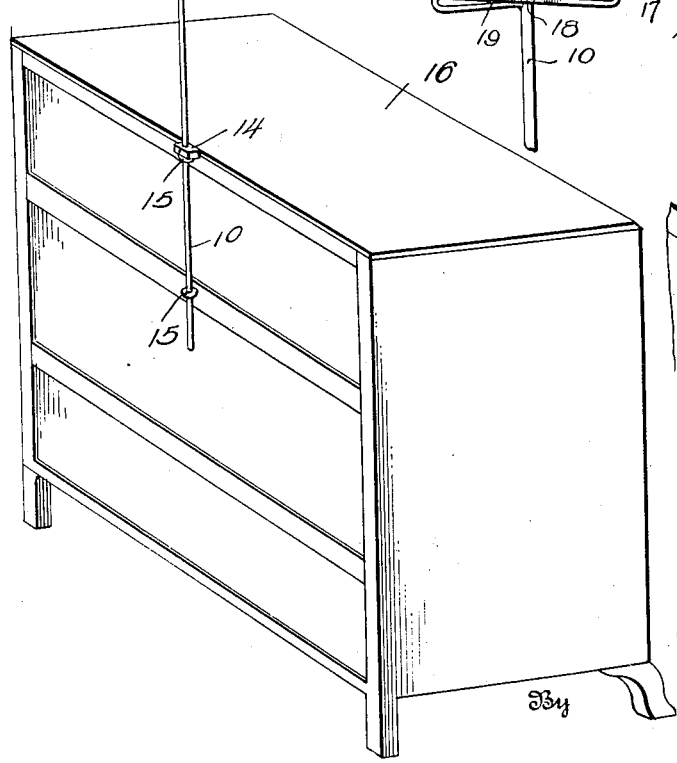
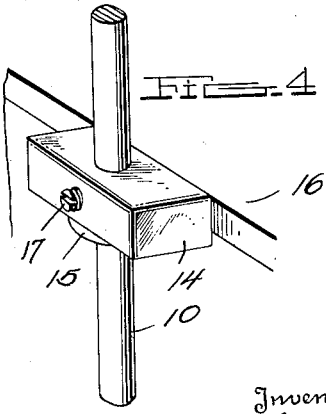
Inventor,
John Henry De Boer,
By Davis & Davis,
Attorneys Patented Sept. 12, 1933

1,926,994

UNITED STATES PATENT OFFICE 1,926,994

DRESSER MIRROR HANGER

John Henry De Boer, Syracuse, N. Y.

Application September 9, 1932. Serial No. 632,412

2 Claims. (Cl. 45—88)

In that type of dresser or bureau which is unprovided with a mirror, it is the usual custom to hang the mirror independently on the wall of the room at a point above the dresser. This is done to give a colonial effect. It is the object of my invention to provide the dresser with a mirror support that is so constructed and arranged that it will support the mirror directly on the dresser and at the same time give to the eye the effect of being independently supported on the wall, back of the mirror.

Referring to the drawing annexed;

Figure 1 is a front view of a dresser and mirror with my invention applied thereto;

Figure 2 is a back perspective view of the dresser, with the mirror removed, but provided with my mirror hanger.

Figures 3 and 4 are detail views showing more particularly the manner of supporting the hanger rod upon the dresser;

Figure 5 is a miniature back view of the dresser showing a modified form of my device;

Figure 6 is a detail view of one of the hangers used in Figure 5, and

Figure 7 is a view of a modification.

Referring to the drawing annexed, by reference characters, 10 designates a metal rod provided at its extreme upper end with a hook 11 on which the mirror 12 is hung in the manner of a picture, the back of the mirror being provided with a suitable eye or hook or wire for this purpose.

At a point below the mirror-hook 11 the rod 10 is folded upon itself to provide two lateral arms 13, arranged in the same plane and directly opposite each other, thus giving to the upper part of the rod the general formation of a cross.

The lower end of the rod is free of obstructions but at a suitable point in its length it has fastened on it by a set screw 17 a squared collar 14, which when the rod is inserted down through eyes 15, will rest upon the uppermost eye and thus support the rod and the mirror. These eyes 15 are screwed into the back wall of the dresser 16 at points sufficiently far apart to hold the rod in a true vertical position. The upper eye 15 is screwed into the dresser at a point a little below the top surface thereof so that when the collar 14 is resting thereon, one of its flat sides will engage the adjacent flat surface of the dresser and thus prevent the rod rotating in its supporting eyes, thereby maintaining the mirror in parallelism with the back wall of the dresser and with the wall of the room. This collar 14 also obviously enables the mirror to be vertically adjusted with reference to the surface of the dresser, so that if desired the mirror can be brought down sufficiently low to entirely obscure the supporting rod, although it has been found that this supporting rod shows so little of its length, even when the mirror is adjusted well above the dresser, that it is too inconspicuous to be readily noticed.

The idea of making the top portion of the rod cross-shaped, i. e. with lateral arms, is to afford a flat support for the back of the mirror and thus prevent the mirror swaying or twisting on its hanger hook 11, thereby at all times holding the mirror in proper relationship to the dresser.

In the modification shown in Fig. 5, I provide a structure which is especially adapted for wide mirrors. In this construction I use two rods and by reason of this fact I am enabled to do away with the lateral arms 13. In this construction the collar 14 obviously enables the mirror to be properly levelled with respect to the top surface of the dresser. It will also be seen that with either one of the structures herein described it is a simple matter to remove the mirror and its hanger rod or rods from the dresser for the purpose of moving or shipment, or for cleaning or repairing the mirror.

In Fig. 2 the arms 13 are formed by bending the rod 10 outwardly in opposite directions to form loop-like projections, while in Fig. 7 the arms 13 are formed of a separate piece of rod bent as shown and having its ends brazed to the rod 10. In this form of device it is desirable to braze or solder this separate rod to the rod 10 at 18, where it crosses the rod 10. It is also desirable to solder the two legs of the arms 13 at points 19. This modification shown in Fig. 7 is more desirable as it is simpler to manufacture and is more rigid.

I claim:

1. In combination with a dresser having two eyes attached to its back wall, a mirror supporting rod extending down through both said eyes and rotatably and slidably carrying a flat-sided collar at a point above the upper eye, and means securing said collar to said rod in any adjusted position, said collar being adapted to rest on the eye and thus support the rod and have one of its flat faces in engagement with the flat wall of the dresser to thus prevent rotation of the rod, the upper end of said rod being provided with a mirror hanging hook.

2. In combination with a dresser having a pair of separated eyes fastened to its rear wall, these eyes being arranged in vertical alignment, a mirror hanging rod depending through said eyes and provided with a supporting element adapted to rest on the upper one of said eyes at a point below the upper surface of the dresser, the upper portion of the rod being provided with a pair of lateral arms to form a flat rest for the mirror, and the rod being further provided at a point above said arms with a hanger hook for the mirror.

JOHN HENRY DE BOER.